Feb. 23, 1954   W. G. ABBOTT, JR   2,669,836
REACTION DEVICE
Filed Oct. 15, 1946   3 Sheets-Sheet 1

Inventor,
William G. Abbott, Jr.,
by Roberts, Cushman & Grover
Attys.

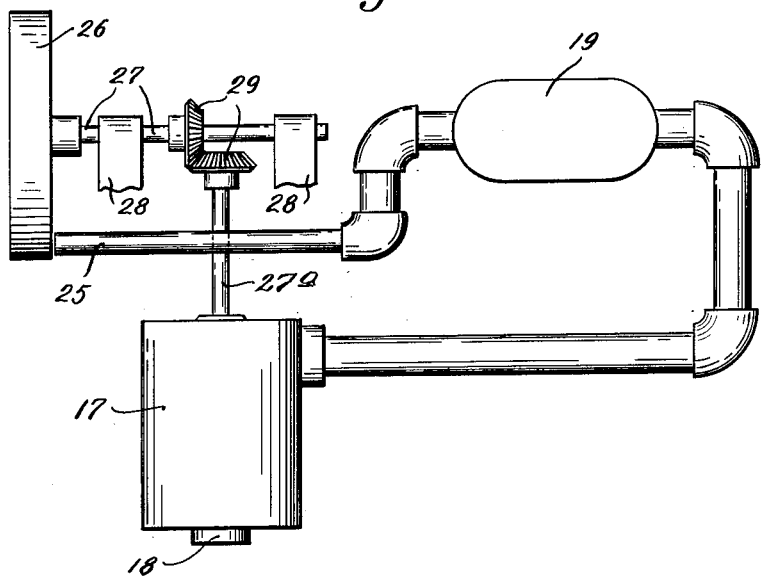
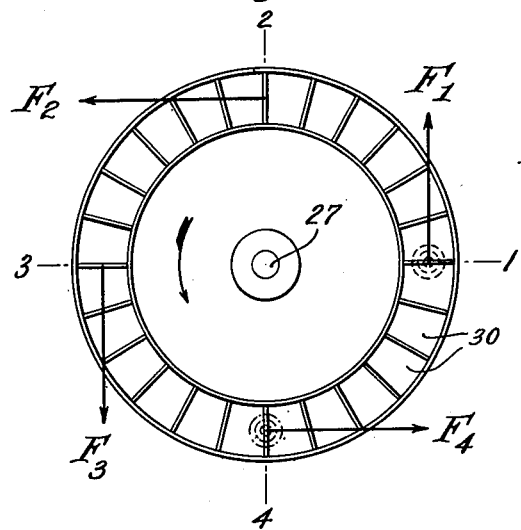
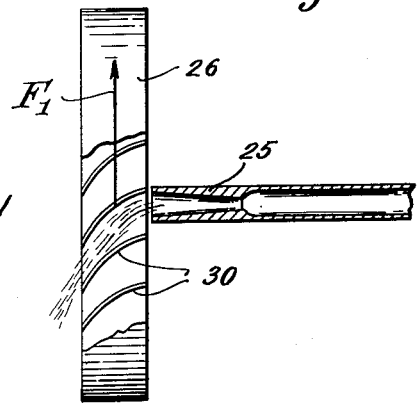

Feb. 23, 1954  W. G. ABBOTT, JR  2,669,836
REACTION DEVICE
Filed Oct. 15, 1946  3 Sheets-Sheet 3

Inventor,
William G. Abbott, Jr.,
by Roberts, Cushman & Grove
Attys.

Patented Feb. 23, 1954

2,669,836

UNITED STATES PATENT OFFICE 2,669,836

REACTION DEVICE

William G. Abbott, Jr., Milford, N. H.

Application October 15, 1946, Serial No. 703,364

8 Claims. (Cl. 60—35.6)

This invention relates to a reaction device and involves utilization of a jet in an improved manner to apply an unbalanced thrust to a movable frame. Such frame to which the unbalanced thrust is applied may be attached to or constitute a part of a vehicle such as an automobile or locomotive movable on land, a ship movable in or through the water, or an aerial vehicle movable through or above the atmosphere.

The principle of jet propulsion has been applied to propel aerial vehicles by causing a jet of expanding gas to discharge from the vehicle, the reaction of the jet upon the vehicle being relied upon to force the vehicle forward. To be effective, the jet must be of high velocity, with the consequence that in order to secure propulsive efficiency the speed of the vehicle must likewise be high. The propulsive efficiency of such apparatus would become very low at moderate speeds of flight. For this reason also jet propulsion has hitherto been impracticable of application to land or water vehicles.

A principal object of the invention is to enable a jet to be used efficiently to apply thrust at low or moderate speeds of propulsion. A further related object is to increase the practical effectiveness of a jet applying a useful thrust even when the vehicle has little or no appreciable component of motion in the direction of such thrust.

The invention also aims to provide for readily controlling the direction of thrust received by the movable frame and vehicle from the jet.

Further advantageous features of the invention will be apparent from this specification and its drawings wherein the invention is explained by way of example by the description of specific mechanism embodying the invention.

Fig. 3 is a diagrammatic elevation of a second form of reaction device according to the invention, showing one position of the adjustable nozzle thereof;

Fig. 4 is a diagram, partly in cross section, of the nozzle and discharge-directing means of the device of Fig. 3, showing a different position of the adjustable nozzle;

Fig. 5 is a diagram in the nature of an end view of the discharge-directing means of the device of Figs. 3 and 4;

Figure 1:
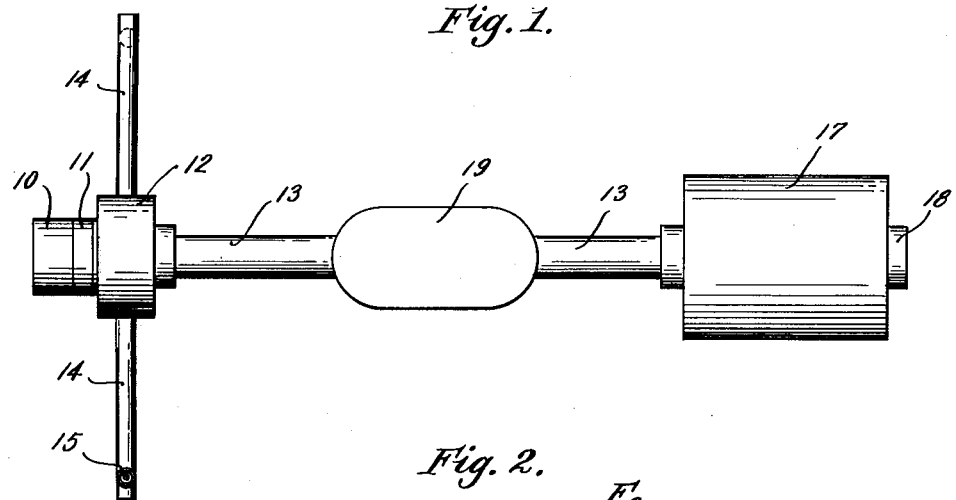
Fig. 1 is a diagrammatic elevation of one form of reaction device according to the invention.

In each of the two forms of reaction devices illustrated in the drawings, a flow of discharging gas is established and is caused to react upon a gas discharge-directing means which is mounted on the movable frame for movement in a circular path with reference to the frame, and the discharge-directing means receives a force of reaction from the discharging gas tangentially of such circular path. Provision is made for opposing the circular movement of the discharge-directing means, and the apparatus is constructed for relative inequality of reaction of the gas upon the discharge-directing means for different portions of the circular path, thus subjecting the discharge-directing means and hence the movable frame to an unbalanced thrust. Inequality of reaction for different portions of the circular path is preferably accomplished by limiting the locus of reaction to a portion only of the circular path, as will be seen from the description of the two illustrated forms of device. By shifting this locus of reaction the direction of the unbalanced thrust can be varied relatively to the frame.

Reference has been made to the discharge-directing means receiving a force of reaction tangentially of its circular path. By this it is not meant to imply that the force of reaction must be received only tangentially, but rather that a tangential component of force is received by the discharge-directing means.

Figure 2:
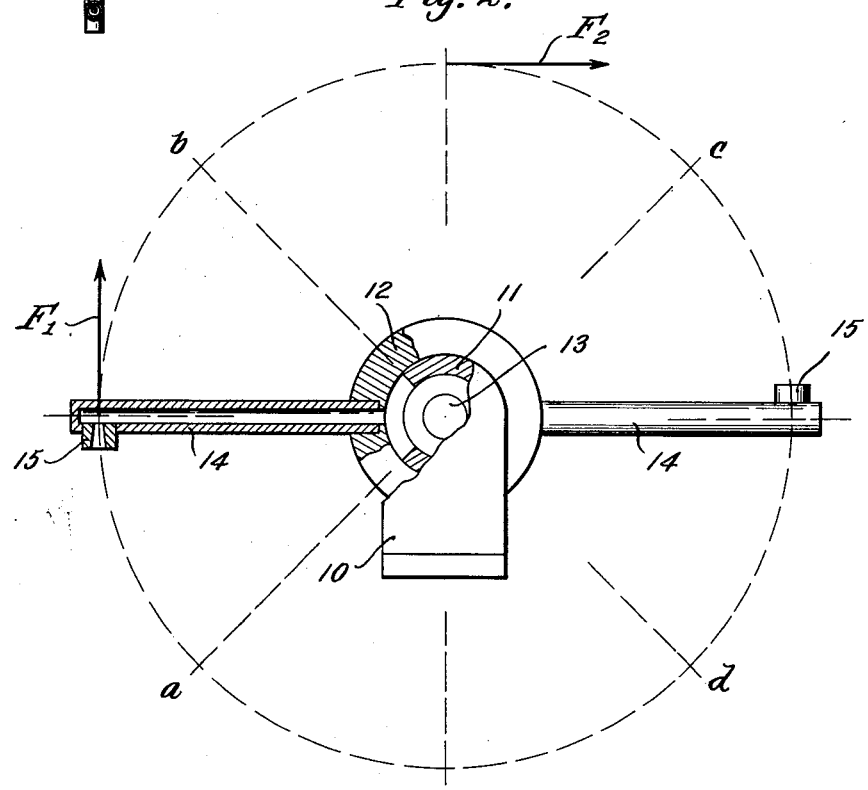
Fig. 2 is a diagram in the nature of an end view, partly in cross section, of the discharge-directing means of the device of Fig. 1.

Referring particularly to Fig. 2, a portion of the movable frame is indicated at 10 in the form of a bearing bracket adapted to be attached to a movable vehicle. A hollow normally stationary sleeve 11 is manually rotatably adjustable in the bracket 10. A hub 12 is rotatable with a close running fit upon the sleeve 11. The hub 12 is secured to a hollow rotatable shaft 13 which constitutes a conduit for admitting gas under pressure into the interior of sleeve 11.

A plurality of tubular arms 14, 14 extend radially from the hub 12 and carry tangentially directed expansion nozzles 15, 15 adjacent to their outer ends. As indicated in Fig. 2 the sleeve 11 is cut away through an arc $a-b$ to establish communication between the interior of sleeve 11 and the tubes 14 as these tubes successively traverse this arc $a-b$. Thus gas is discharged from each nozzle 15 as the nozzle 15 traverses the arc $a-b$ (shown as 90°) and such discharge is cut off during the remaining 270° of the circular path.

The tangential components of reaction of the gas upon each nozzle 15 passing through the arc $a-b$ are thus not balanced by any similar forces in the remainder of the circular path of the nozzle, with the result that passage of each nozzle through arc $a-b$ produces an upward thrust indicated at $F_1$.

Were the rotation of the discharge-directing nozzles 15 in their circular path to be unopposed with reference to the movable frame, the quantity of gas that could be discharged through the nozzles would be limited to the small quantity whose rotary driving torque effect could be balanced by the friction losses, since otherwise uncontrolled rotary acceleration would result. However, provision is made for opposing the circular travel of the discharge-directing means with reference to the frame by applying a torque load upon the discharge-directing means, so that large quantities of gas can be discharged through the discharge-directing means and a substantial thrust transmitted therefrom to the movable frame during operation.

A preferred means for opposing the circular travel of the discharge-directing means comprises a connection to some part of the vehicle adapted to impose a useful load upon the discharge-directing means.

Thus in Fig. 1 the hollow shaft 13 which is secured to hub 12 is shown as connected to drive a compressor 17 having an air intake at 18, the body of the compressor being secured to the frame in any suitable manner. Air compressed by the compressor 17 passes through the first part of hollow shaft 13 into a combustion chamber 19 where liquid fuel is injected and ignited, and the hot products of combustion then pass through the second part of the hollow shaft 13 and into the sleeve 11 and to the nozzles 15.

A portion of the energy of the jet is thus fed by the shaft 13 back into the gas flow establishing means, means utilized in useful work in the compressor 17 in aiding the gas flow; the load imposed by the compressor restrains the circularly moving nozzles 15 from running away due to the accelerating tendency of the jet, limits the speed of the circularly moving nozzles to a reasonable amount, and in addition transmits to the movable frame an unbalanced thrust representing a substantial part of the force of reaction $F_1$. The force of reaction $F_1$, if directed upwardly as indicated in Fig. 2, may be employed to sustain or lift the vehicle. By adjusting the sleeve 11 so as to shift the arc of reaction from the arc $a-b$ to the arc $b-c$, the thrust may be directed horizontally to the right as indicated at $F_2$. By adjusting the sleeve 11 to shift the arc of reaction to the arc $c-d$, the thrust may be directed vertically downwardly. By adjusting the sleeve to shift the arc of reaction to the arc $d-a$, the thrust may be directed horizontally to the left.

Unbalanced thrust imparted to the vehicle by the discharge-directing means of the reaction devices of this invention may be varied in amount by any suitable control mechanism adapted to vary the volume of gas, the pressure of gas, or the amount of torque load applied to the discharge-directing means, or any of these factors in combination.

While in the device of Figs. 1 and 2 the nozzles in which the principal expansion of the gas takes place participate in the circular movement of the discharge-directing means, in the device of Figs. 3, 4 and 5 relatively stationary expansion means are employed to deliver the gas to a circularly moving discharge-directing means.

Thus in Figs. 3, 4 and 5, gas under pressure, for instance from a compressor and combustion chamber, is delivered to an expansion nozzle 25 directed against a turbine wheel 26 which constitutes the discharge-directing means. The turbine wheel 26 is mounted on a shaft 27 which is rotatable in bearing brackets 28, 28 which constitute a portion of the movable frame attached to or forming a part of the movable vehicle. The blades 30 (Fig. 4) of the turbine wheel are formed so as to turn the gas issuing from the nozzle 25 through approximately 90° while operating at a speed of rotation that will abstract approximately all of the jet energy.

The desired unbalance of forces of reaction upon the discharge-directing turbine wheel is preferably secured by applying the expanding gas to the wheel only in a portion of the circular path, this being illustrated in Figs. 3, 4 and 5 by the use of a single expansion nozzle 25 discharging toward only a portion of the circular path of the turbine blades.

Opposition to the circular movement of the discharge-directing turbine wheel can be secured in the same manner as in the devices of Figs. 1 and 2 by connecting the shaft 27 to some useful torque load, such as a compressor 17, an electric generator, a propeller or a traction device, as indicated diagrammatically by the bevel gearing 29 and shaft 27a.

Nozzle 25 is preferably shiftable to various positions, as for instance through the use of a rotatable connection to the combustion chamber 19, so as to vary the direction of unbalanced thrust which is applied to the movable frame. Thus when the nozzle 25 occupies a position on the radial line 1 at the right of the wheel 26 in Fig. 5, upwardly directed thrust $F_1$ is applied. When the nozzle occupies a position on the radial line 2 at the top of the wheel, horizontally directed thrust $F_2$ to the left is applied. When the nozzle 25 occupies a position on the radial line 3 at the left of the wheel, downwardly directed thrust $F_3$ is applied. When the nozzle 25 occupies a position on the radial line 4 at the bottom of the wheel, horizontally directed thrust $F_4$ to the right is applied.

In Figs. 6 to 9, inclusive, in which various applications of the invention to vehicles are shown, reference character 35 is used to indicate the peripheral path of travel of the discharge-directing means of a reaction device according to this invention, such as that of the nozzle 15 of Figs. 1 and 2 or that of the turbine wheel 26 of Figs. 3, 4 and 5.

Figure 6:
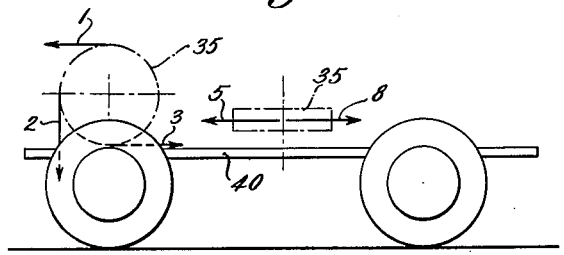
Fig. 6 is a diagram in the nature of a side elevation, showing applications of either of the above forms of reaction device to a land vehicle.
Figure 7:
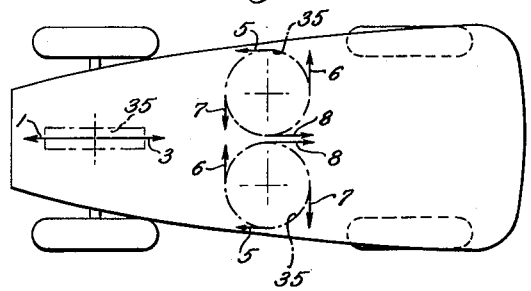
Fig. 7 is a diagram in the nature of a plan view of the apparatus of Fig. 6.

Figs. 6 and 7 show various possible alternate or joint applications of the device to an automobile.

In Figs. 6 and 7 three such reaction devices are shown as mounted on an automobile 40, one having its discharge-directing means rotatable about a horizontal axis near the front of the automobile so that its peripheral path lies in a vertical plane as best shown in Fig. 6, and the other two having their discharge-directing means rotatable about vertical axes near the middle of the automobile, so that they rotate in horizontal planes as best shown in Fig. 7.

By adjustment of the direction of thrust as explained above, the thrust of any of the reaction devices can be directed to cause different effects upon the vehicle. By directing the thrust in direction 1, the thrust can be applied to move the vehicle forward (to the left in Fig. 6). By directing the thrust in direction 2, the thrust can be applied to secure extra traction or reaction against bouncing. By directing the thrust in direction 3, a braking or reversing action can be secured.

Likewise by directing the thrust upon the other reaction devices of Figs. 6 and 7 in direction 5, the thrust can be applied to drive the vehicle forwardly. In direction 6 a side thrust upon the vehicle, toward its right, is provided, adapted to resist skidding of the vehicle toward its left. Similarly in direction 7 a side thrust upon the vehicle toward its left is secured. In direction 8 a braking or reversing action is secured.

Various directions of thrust intermediate these directions can be employed, yielding combinations of the several described effects.

Figure 8:
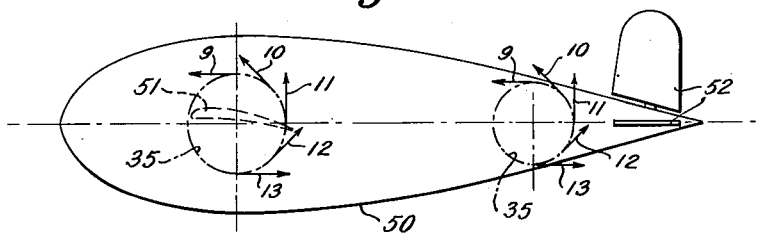
Fig. 8 is a diagram in the nature of a side elevation, showing applications of either of the above forms of reaction device to an aerial vehicle.
Figure 9:
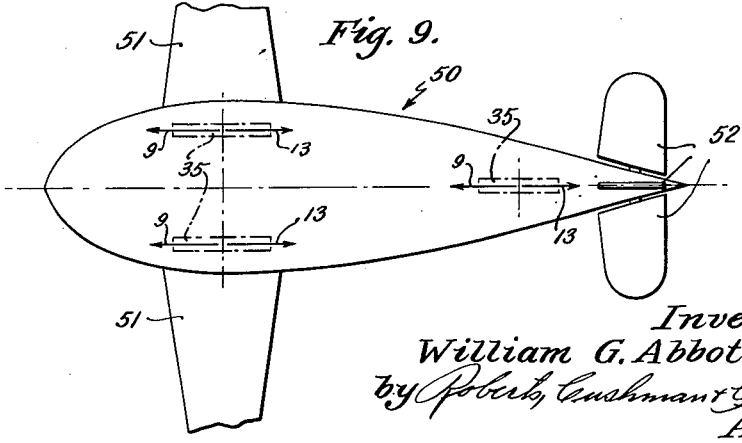
Fig. 9 is a diagram in the nature of a plan view of the apparatus of Fig. 8.

Figs. 8 and 9 show application of three reaction devices to an airplane indicated diagrammatically at 50. The airplane is shown as provided with small wing surfaces 51 and small control surfaces 52, although some or all of these surfaces could be omitted if the forces applied to the airplane by the reaction devices are sufficiently large.

By directing the thrust in the following directions, the following effects can respectively be secured:

In direction 9, forward propulsion; in direction 10 combined lift and forward propulsion; in direction 11, lift; in direction 12, combined lift and braking action; in direction 13, braking action.

If thrust is available in sufficient amount to raise the plane without aid of wings, the thrust may first be directed upwardly, or upwardly and forwardly, to raise the plane. Then by gradually changing the direction of thrust toward the forward direction, forward speed of the plane may be increased and the support of the plane transferred to the wing surfaces.

If resistance of the wing surfaces is to be used in taking off as well as in flight, speed on the ground can first be secured by forwardly directed thrust, and when sufficient forward speed has been attained, upward thrust can be exerted to assist take-off.

In flight, the control surfaces can be set so as to tend to maintain the plane in steady flight, and changes in elevation and direction can be secured by adjustment of the directions and amount of thrust applied by the reaction device or devices. Alternatively, the reaction device or devices can be set so as to tend to hold the plane in steady flight, and changes in direction and elevation can be secured by manipulation of the control surfaces 52. If desired, changes in direction or elevation can be assisted by adjustment both of the control surfaces and of the reaction device or devices.

It will be seen that in each illustrated embodiment of the invention and in each illustrated example of its application to a vehicle, a high-velocity jet is enabled to apply a propulsive thrust to a vehicle in an efficient manner notwithstanding the vehicle speed may be relatively low.

I claim:

1. Reaction device comprising a movable vehicle frame, means for supplying gas under pressure, nozzle means mounted on said vehicle frame and adapted to discharge said gas, gas discharge-directing means movable in a circular path past said nozzle means and receiving force of reaction from the discharging gas tangentially of said circular path, and feed back means transferring energy received from the discharge directing means back into the gas flow establishing means thereby to provide a load opposing said circular movement of said discharge-directing means with reference to said frame, said nozzle means being arranged to deliver discharging gas to said discharge-directing means unequally with respect to different portions of said circular path so as to subject said movable vehicle frame to an unbalanced force.

2. Reaction device comprising a movable vehicle frame, means for supplying gas under pressure, nozzle means mounted on said vehicle frame and adapted to discharge said gas, gas discharge-directing means movable in a circular path past said nozzle means and receiving force of reaction from the discharging gas tangentially of said circular path, and feed back means transferring energy received from the discharge directing means back into the gas flow establishing means thereby to provide a load opposing said circular movement of said discharge-directing means with reference to said frame, said nozzle means being arranged to deliver discharging gas to said discharge-directing means through a portion only of said circular path so as to subject said movable vehicle frame to an unbalanced force.

3. Reaction device comprising a movable vehicle frame, means including a compressor for supplying gas under pressure, nozzle means mounted on said vehicle frame and adapted to discharge said gas, gas discharge-directing means movable in a circular path past said nozzle means and receiving force of reaction from the discharging gas tangentially of said circular path, said compressor being driven by the circular movement of said discharge directing means thereby to feed back into said flow of discharging gas energy from said discharge-directing means, said nozzle means being arranged to deliver discharging gas to said discharge-directing means unequally with respect to different portions of said circular path so as to subject said movable vehicle frame to an unbalanced force.

4. Reaction device comprising a movable vehicle frame, means for establishing a flow of discharging gas, gas discharge-directing means mounted on said vehicle frame for movement in a circular path with reference to said frame and receiving force of reaction from the discharging gas tangentially of said circular path, feed back means transferring energy received from the discharge directing means back into the gas flow establishing means thereby to provide a load opposing said circular movement of said discharge-directing means with reference to said frame, and means for limiting the locus of reaction of the discharging gas upon said discharge-directing means to a portion only of said circular path, to subject said frame to an unbalanced thrust, and means for shifting said locus of reaction circumferentially of said circular path so as to vary the direction of said unbalanced thrust relative to the movable vehicle frame.

5. Reaction device comprising a movable vehicle frame, means for supplying gas under pressure, gas discharge-directing means including a nozzle adapted to discharge said gas and means for mounting said nozzle on said vehicle frame for movement in a circular path with reference to said frame, said nozzle being arranged to receive force of reaction from the discharging gas tangentially of said circular path, feed back means transferring energy received from the discharge directing means back into the gas flow establishing means thereby to provide a load opposing said circular movement of said nozzle with reference to said frame, and means for limiting discharge of gas through said nozzle to a portion only of said circular path, to subject said frame to an unbalanced thrust, and means for circumferentially shifting the location of such portion of said circular path so as to vary the direction of said unbalanced thrust relative to the movable vehicle frame.

6. Reaction device comprising a movable vehicle frame, means for supplying gas under pressure, nozzle means mounted on said vehicle frame and adapted to discharge said gas, gas discharge-directing means movable in a circular path past said nozzle means and receiving force of reaction from the discharging gas tangentially of said circular path, and feed back means transferring energy received from the discharge directing means back into the gas flow establishing means thereby to provide a load opposing said circular movement of said discharge-directing means with reference to said frame, said nozzle means being arranged to deliver discharging gas to said discharge-directing means through a portion only of said circular path, to subject said frame to an unbalanced thrust, and means for circumferentially shifting the location of such portion of said circular path so as to vary the direction of said unbalanced thrust relative to the movable vehicle frame.

7. The method of propelling a vehicle comprising causing flow of gas through a discharge directing member adapted to receive reaction therefrom, constraining the discharge directing member to travel about a circular path with relation to the vehicle, the gas exerting a reaction having a component tangential to said circular path, imposing a torque load opposing the circular movement of said discharge directing member, feeding the energy obtained from said torque loading back to aid its flow of gas causing the flow of gas so to react in a portion only of said circular path, and shifting the location of said portion to the path to vary the direction of the resulting unbalanced thrust upon the vehicle.

8. The method of propelling a vehicle comprising causing flow of gas through a discharge directing member adapted to receive reaction therefrom, constraining the discharge directing member to travel about a circular path with relation to the vehicle, the gas exerting a reaction having a component tangential to said circular path, imposing a torque load opposing the circular movement of said discharge directing member, feeding the energy obtained from said torque loading back to aid the flow of gas, causing the flow of gas so to react to a greater extent in one part of the path than in the remainder of the path, and shifting the location of said part of said path to vary the direction of the resulting unbalanced thrust upon the vehicle.

WILLIAM G. ABBOTT, Jr.

References Cited in the file of this patent

UNITED STATES PATENTS

| Number | Name | Date |
|---|---|---|
| 987,842 | Waller | Mar. 28, 1911 |
| 1,638,071 | Travnicek | Aug. 9, 1927 |
| 1,643,862 | Travnicek | Sept. 27, 1927 |
| 1,744,520 | Blitz | Jan. 21, 1930 |
| 1,831,540 | Nelson | Nov. 10, 1931 |
| 1,976,030 | Lighthall | Oct. 9, 1934 |
| 2,395,253 | Covey | Feb. 19, 1946 |
| 2,439,717 | Cooke | Apr. 13, 1948 |

FOREIGN PATENTS

| Number | Country | Date |
|---|---|---|
| 18,049 | Great Britain | Aug. 8, 1913 |